United States Patent
Diedrich et al.

(10) Patent No.: US 7,257,427 B2
(45) Date of Patent: Aug. 14, 2007

(54) SYSTEM AND METHOD FOR MANAGING MOBILE COMMUNICATIONS

(75) Inventors: Nathaniel W. Diedrich, Dublin, OH (US); Ross C. Miller, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 378 days.

(21) Appl. No.: 10/674,426

(22) Filed: Oct. 1, 2003

(65) Prior Publication Data

US 2005/0075128 A1 Apr. 7, 2005

(51) Int. Cl.
*H04M 1/00* (2006.01)

(52) U.S. Cl. ............... 455/569.2; 455/345; 455/414.1; 455/414.2; 455/566; 455/575.9; 379/93.07; 379/100.12; 379/219; 379/413.02; 370/395.51; 701/23; 701/28; 701/29; 701/36; 701/99; 701/211; 709/218; 709/225; 709/229

(58) Field of Classification Search ............. 455/414.1, 455/414.3, 41.1, 79, 552.1, 556.1, 557, 566, 455/569.1, 575.9, 90.1, 99, 152.1, 297, 344, 455/345, 346, 414.2; 370/328, 395.51, 912, 370/913; 379/15.02, 88.17, 93.07, 100.12, 379/219, 413.02; 701/23, 28, 29, 36, 99, 701/200, 201, 202, 206, 211; 709/218, 225, 709/229

See application file for complete search history.

(56) References Cited

U.S. PATENT DOCUMENTS

| | | | | |
|---|---|---|---|---|
| 5,805,587 A | * | 9/1998 | Norris et al. | 370/352 |
| 5,946,623 A | * | 8/1999 | Spradlin | 455/445 |
| 5,964,381 A | * | 10/1999 | El-Hage et al. | 222/386 |
| 5,982,774 A | * | 11/1999 | Foladare et al. | 370/401 |
| 6,125,177 A | * | 9/2000 | Whittaker | 379/243 |
| 6,138,031 A | | 10/2000 | Sillanpää et al. | |
| 6,154,649 A | | 11/2000 | Reichstein | |
| 6,188,886 B1 | * | 2/2001 | Macaulay et al. | 455/415 |
| 6,317,488 B1 | * | 11/2001 | DePond et al. | 379/93.35 |
| 6,366,661 B1 | * | 4/2002 | Devillier et al. | 379/211.01 |
| 6,377,668 B1 | * | 4/2002 | Smock et al. | 379/142.08 |
| 6,377,825 B1 | * | 4/2002 | Kennedy et al. | 455/569.2 |
| 6,404,764 B1 | * | 6/2002 | Jones et al. | 370/352 |
| 6,463,146 B1 | * | 10/2002 | Hartley et al. | 379/215.01 |
| 6,519,252 B2 | * | 2/2003 | Sallberg | 370/356 |
| 6,535,743 B1 | * | 3/2003 | Kennedy et al. | 455/456.1 |
| 6,560,239 B1 | * | 5/2003 | Frid et al. | 370/426 |
| 6,693,897 B1 | * | 2/2004 | Huang | 370/352 |

(Continued)

OTHER PUBLICATIONS

Author unknown, 2003 Honda Accord NAVI System Owner's Manual, Published 2002.

*Primary Examiner*—William Trost
*Assistant Examiner*—James D. Ewart
(74) *Attorney, Agent, or Firm*—Plumsea Law Group, LLC; Mark E. Duell

(57) ABSTRACT

A system and method for managing mobile communications is disclosed. The system and method can determine which of several systems associated with a motor vehicle is permitted to communicate with a user interface in the motor vehicle. The user interface is used to assist in facilitating communications between a user and one of the communications systems. The user interface can include a display and be connected to at least one loudspeaker. The various systems associated with the vehicle communicate with one another and determine which system can communicate with the user interface.

28 Claims, 5 Drawing Sheets

U.S. PATENT DOCUMENTS

| | | | |
|---|---|---|---|
| 6,757,274 B1 * | 6/2004 | Bedingfield et al. | 370/352 |
| 6,816,481 B1 * | 11/2004 | Adams et al. | 370/352 |
| 6,847,631 B1 * | 1/2005 | Lawser et al. | 370/352 |
| 6,917,801 B2 * | 7/2005 | Witte et al. | 455/418 |
| 6,920,126 B2 * | 7/2005 | Becher et al. | 370/338 |
| 7,009,946 B1 * | 3/2006 | Kardach | 370/310 |
| 7,035,390 B2 * | 4/2006 | Elliott | 379/201.02 |
| 2003/0068999 A1 * | 4/2003 | Casali et al. | 455/345 |
| 2003/0098773 A1 * | 5/2003 | Chakravarty et al. | 340/3.1 |
| 2003/0125023 A1 * | 7/2003 | Fishler | 455/426 |
| 2004/0192405 A1 * | 9/2004 | Van Bosch | 455/569.1 |

* cited by examiner

| Action or Event | Current State | | | | | |
|---|---|---|---|---|---|---|
| | VCS SR | HFT SR | HFT Call | On★ SR | OPC Call | OCC Call |
| Activate VCS SR | --- | HFT SR | HFT Call | On★ SR | OPC Call | OCC Call |
| Activate HFT SR | HFT SR | --- | HFT Call | On★ SR | OPC Call | OCC Call |
| Incoming HFT Call | HFT Call | HFT Call | In HFT Call SR | On★ SR | OPC Call | OCC Call |
| Activate On★ SR | On★ SR | On★ SR | HFT Call + Incoming HFT Call | --- | OPC Call Cell Phone rings | OCC Call Cell phone rings |
| Incoming OPC Call | OPC Call | HFT SR | On★ SR | OPC Call | --- | OCC Call |
| OCC Call Activate or Incoming | OCC Call | OCC Call | OCC Call | OCC Call | OCC Call | --- |

Figure 5

SYSTEM AND METHOD FOR MANAGING MOBILE COMMUNICATIONS

BACKGROUND

1. Field of the Invention

This invention relates to a system and method for managing a mobile communication system, more particularly, to a system and method for managing multiple mobile communications systems associated with a motor vehicle.

2. Related Art

Existing communications systems in motor vehicles can be designed to function with an audio system in the motor vehicle. For example, some systems allow the audio or output of a mobile telephone to be heard through an audio system in a motor vehicle and through the speakers built into the motor vehicle.

Other systems also integrate or cooperate with a vehicle navigation system. In these systems, the vehicle navigation system provides voice or audio output to assist a driver and to provide turn-by-turn directions. The navigation systems in these systems sometimes use the vehicle's existing audio system and speakers to provide the voice or audio output.

However, these existing systems are largely stand alone systems that are cobbled together with a motor vehicle's audio system. Their integration with the motor vehicle's audio system is rudimentary and they do not have the ability to coordinate with other systems.

There is currently a need for a system and method that can coordinate various different components or systems and manage their communication and interaction with a motor vehicle's audio system.

SUMMARY

The present invention provides a system and method for managing mobile communications. The invention can be used with a hands free telephone or other communication system in a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

The system and method can operate with one or more communications systems and can manage calls received by the various communications systems associated with a vehicle.

In one aspect, the invention includes a vehicle communication system comprising a first communication system connected to a user interface and capable of sending information to the user interface, a second communication system connected to the user interface and capable of sending information to the user interface, the user interface comprising at least one control and a display, the user interface being connected to at least one loudspeaker, where the first communication system and the second communication system communicate with one another and determine which system can communicate with the user interface.

In another aspect, the invention includes a first communications system that includes provisions for sending and receiving wireless telephone calls.

In another aspect, the invention includes a first communication system that is configured to communicate with a wireless telephone.

In another aspect, the invention includes a first communication system that is configured to wirelessly communicate with a wireless telephone.

In another aspect, the invention includes a first communication system that is configured to wirelessly communicate with a wireless telephone using Bluetooth.

In another aspect, the invention includes a first communication system that is configured to wirelessly communicate with a microphone using Bluetooth.

In another aspect, the invention includes a second communication system that is configured to wirelessly communicate with vehicle assistance service provider.

In another aspect, the invention includes a first communication system that communicates with the second communication system using CAN.

In another aspect, the invention includes a second communication system that is configured to receive different types of calls from a second communication service provider and information related to the different types of calls is used to determine which system can communicate with the user interface.

In another aspect, the invention includes a motor vehicle comprising a chassis and at least one wheel adapted to contact a road surface, an interior including a steering wheel, dashboard and driver's seat, a first communication system installed in the motor vehicle and in communication with a user interface and configured to communicate with a first communication network, a second communication system installed in the motor vehicle and in communication with the user interface and configured to communicate with a second communications network, and where the first communication system communicates with the second communication system.

In another aspect, the invention includes a first communication system that is engaged in an active call, the second communication receives a second call while the first communication system is engaged in the active call and the active call is interrupted by the second call.

In another aspect, the invention includes a first communication system that communicates with the second communication system and the two communications systems, by communicating with one another, determine which communication system is given priority.

In another aspect, the invention includes a motor vehicle including a chassis, at least one wheel adapted to contact a road surface, and an interior; the interior including a steering wheel, a dashboard and a driver's seat; comprising a first communication system in communication with the motor vehicle and configured to communicate with a first communication network, a second communication system in communication with the motor vehicle and configured to communicate with a second communications network, where the first communications network is different than the second communications network, and where the first communication system communicates with the second communication system.

In another aspect, the invention includes a first communication system that is configured to receive information from a wireless telephone network.

In another aspect, the invention includes a second communication system that is configured to receive information from a driver assistance network.

In another aspect, the invention provides a first communication system and a second communication system that communicate with one another to determine which communication system has priority.

In another aspect, the invention includes a second communication system that interrupts a call in progress on the first communication system.

In another aspect, the invention includes a second communication system that retains priority over a call received by the first communication system.

In another aspect, the invention includes a vehicle control system with speech recognition and where the first communication system has priority over the vehicle control system.

In another aspect, the invention includes a first communication system that retains priority over a call received by the second communication system.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 is a table of a preferred embodiment of a process or logic for resolving conflicts in accordance with the present invention.

DETAILED DESCRIPTION OF THE PREFERRED EMBODIMENT(S)

Figure 1:
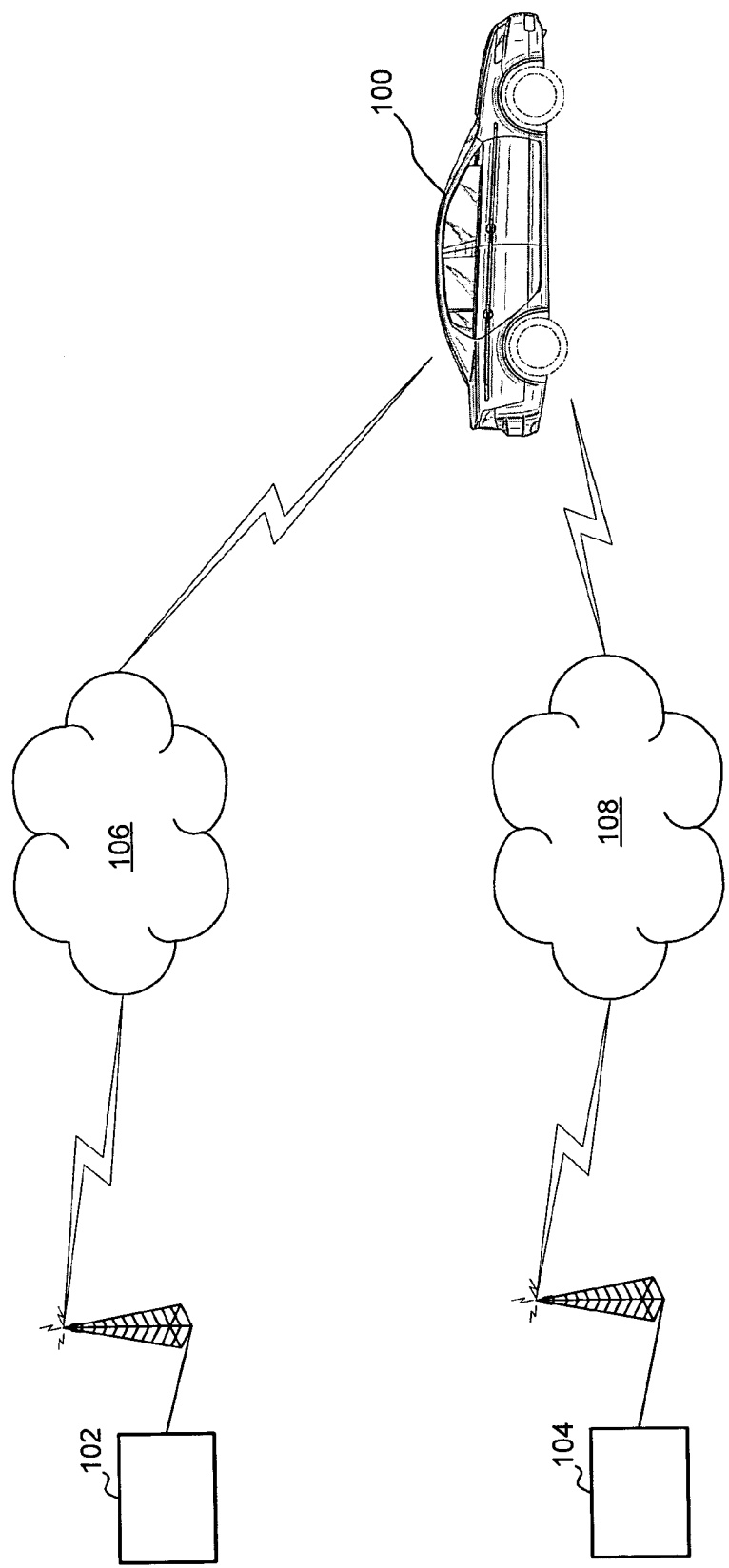
FIG. 1 is a schematic diagram of a preferred embodiment of a vehicle with several communications service providers in accordance with the present invention.

FIG. 1 is a schematic view of an illustrative embodiment of a motor vehicle 100 with one or more communications service providers. In the embodiment shown in FIG. 1, two communications service providers, a first communications service provider 102 and a second communications service provider 104 provide wireless communications services to vehicle 100.

Preferably, first communications service provider 102 uses a first communications network, also referred to as first network 106 and second communications service provider 104 uses a second communications network, also referred to as second network 108. In some embodiments, first network 106 is different than second network 108. For example, first network 106 can be a typical cellular telecommunications network using CDMA, TDMA, GSM or WCDMA protocols and second network 108 can be a driver assistance network using an analog network. In other embodiments, both first network 106 and second network 108 are both digital networks, but the service providers associated with those networks are different. In other embodiments, both networks are cellular wireless telephone networks, but the service providers are different. In other embodiments, both the first network 106 and second network 108 are supported by the same service provider, but the type of service on each network is different. Regardless of the type or form of the two wireless networks, preferably, motor vehicle 100 includes equipment that permits communication with both networks.

In a preferred embodiment, first communications service provider 102 provides wireless telephone services to vehicle 100 via first network 106 and second communications service provider 104 provides vehicle support services via second network 108. Vehicle support services include service providers that provide driver or vehicle assistance, for example, OnStar®.

Figure 2:
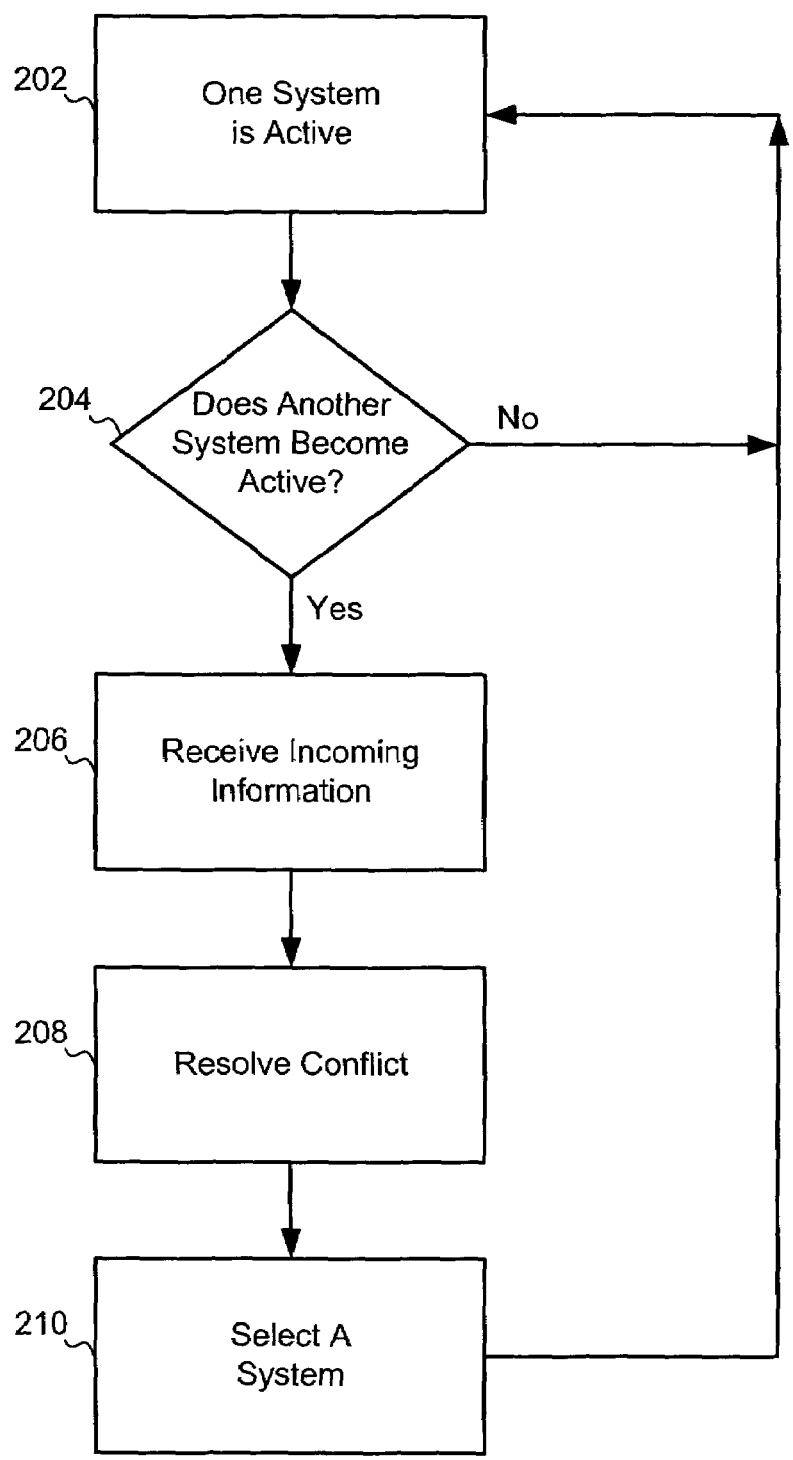
FIG. 2 is a flow diagram of a preferred embodiment of a method for managing multiple communications to a vehicle in accordance with the present invention.

FIG. 2 is a flow diagram of a preferred embodiment of a method for managing mobile communications. The method can be used where multiple communications systems are capable of communicating with a motor vehicle. The method also includes provisions for integrating two or more communications systems with a vehicle control system. The process begins in step 202 where one system is active. In this step, one of the systems associated with a motor vehicle is currently in use or has received a communication from its associated communications network.

While one of the systems is active, the process waits for another communication from a different system. This occurs in step 204. In many cases, no other system becomes active and the process returns to step 202. However, in some cases, another system becomes active while the first communication is in progress. If another system becomes active, the process moves to step 206.

After the second system becomes active, the process then resolves the conflict between the two systems and determines which system remains active and continues to interact with the user and which system is required to terminate operations. Any system or method can be used to resolve this conflict. However, in a preferred system, the communication systems communicate with one another and determine which system should communicate with the user. Once the communications systems have determined which one is permitted to continue communications with the user, the vehicle control system is then informed of the decision and relinquishes control to the communications systems. While any kind of logic or decision-making procedure could be used, preferably, the decision is made using logic shown in tabular form in FIG. 5, as disclosed below. After the conflict has been resolved, one of the systems is selected in step 210 and one of the systems is given priority over the other systems and communicates with the user. The other communications systems terminate, hold, or otherwise dispose of their calls or tasks.

Figure 3:
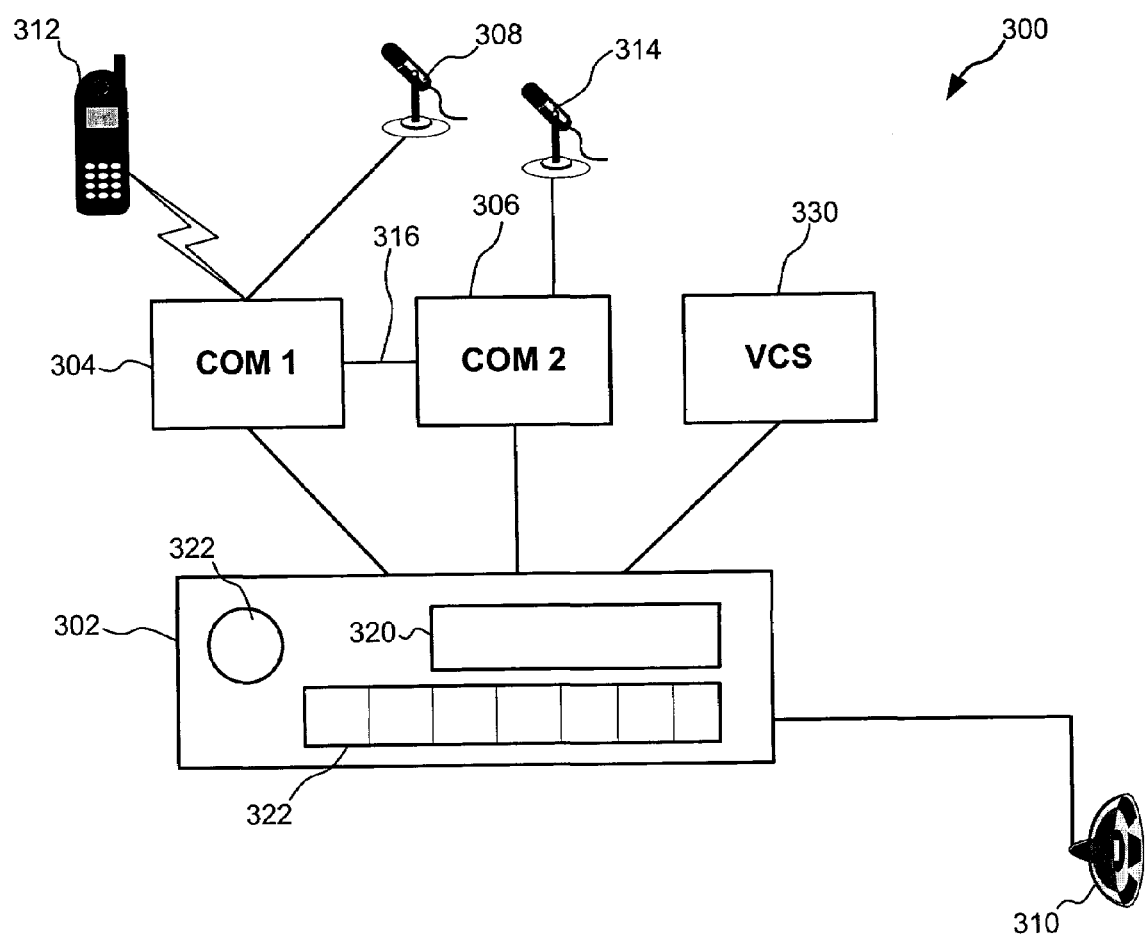
FIG. 3 is a schematic diagram of a preferred embodiment of a communication system in accordance with the present invention.

FIG. 3 is a schematic diagram of a preferred embodiment of a vehicle communications system 300. Vehicle communications system 300 includes a user interface, a first communications system, referred to as COM1, 304 a second communications system, referred to as COM2, 306, and a vehicle control system, referred to as VCS, 330. Additional communications systems and/or components can also be present; however, for clarity only two communications systems 304 and 306 are shown. It should be kept in mind that the principles and teachings of the present invention can be applied to systems that include three or more communications systems.

A user interface can be any device that facilitates or assists in facilitating communication with a human user. Typically, the user interface includes provisions to receive audio and/or speech information from a user and provisions to send audio and/or speech information to a human user. The user interface can include a microphone to receive audio and/or speech information, or the user interface can include provisions to receive information from a microphone, such as electrical connections and/or a wireless link. The user interface can also include a loudspeaker or provisions to send audio and/or speech information to one or more loudspeakers, such as electrical connectors and/or a wireless link. In the embodiment shown in FIG. 3, head unit 302 serves as a user interface. COM1 304 can be any device that facilitates communication to and from vehicle 100. In some embodiments, COM1 304 can be a wireless telephone. In the embodiment shown in FIG. 3. COM1 304 is a wireless telephone interface device. COM1 304 communicates with wireless telephone 312 and with microphone 308. Although any method can be used to facilitate communication between COM1 304 and wireless telephone 312 and microphone 308, a wireless system is preferred. In an exemplary embodiment, the Bluetooth® protocol is used to facilitate communication between wireless telephone 312 and COM1 304. In other words, in an exemplary embodiment, COM1 304 is Bluetooth capable, and can communicate wirelessly using the Bluetooth protocol with a wireless telephone 312 that is also Bluetooth capable. A wireless link, including a Bluetooth link, can be used between COM1 304 and microphone 308; however, a wired connection can also be used, and is the preferred arrangement.

COM2 306 can be any device that facilitates communication to and from vehicle 100. As noted above, it is preferred that the communication services provided by COM2 306 are different in some way from COM1. COM2 306 can provide vehicle assistance service, and in an exemplary embodiment, COM2 306 is an OnStar system. COM2 306 is a device or system that includes provisions that permit communications with a communications network used by OnStar. These devices are generally known in the art. Additionally, in some embodiments, COM2 306 is connected to second microphone 314.

VCS 330 can be any kind of vehicle control system. VCS 330 can include one, several or all of the following systems: a navigation system, a climate control system, and/or an audio system. In a preferred embodiment, VCS 330 includes all of those systems and includes speech recognition and processing. The speech recognition feature allows VCS 330 to respond to a number of voice commands. In one embodiment, VCS 330 permits a user to use speech recognition to control the vehicle's climate control system. In that embodiment, the user can operate the following climate control functions using speech recognition: choose or change the mode, temperature, fan speed, air (fresh or re-circulate), A/C compressor (ON or OFF), and defrost (ON or OFF). Also, in some embodiments, users can control virtually all of the audio system functions using speech recognition including but not limited to: change modes, select stations, select CD's, select tracks, play tape, and other audio system functions. In one embodiment, users can control every feature using speech recognition except for the volume adjustment and scan functions. In some embodiments, users can also control and operate virtually every function of a navigation system. In one embodiment, users can interact with the navigation system using speech recognition for every function except to enter proper nouns, for example, place names and street names. Details and syntax of the various voice commands and features associated with a preferred embodiment of a navigation system are described in the Honda Navigation System Owners Manual, the entirety of which is incorporated by reference, herein. VCS 330 can be provided with its own microphone, however, in some cases, VCS 330 shares microphone 308 with COM1 304.

VCS 330 can communicate with head unit 302. Generally, VCS 330 can send audio information to head unit 302 that is suitable for head unit 302 and can be played back through speaker(s) 310. Audio information can also be sent from head unit 302 to VCS 330. Head unit 302 can receive audio information from microphone 308 and transmit this information to VCS 330. In this way, VCS 330 can receive spoken commands from a user. In another embodiment, audio from microphone 308 is sent directly to VCS 330. VCS 330 then executes those commands that it recognizes. On the other hand, if the command is an audio command, VCS 330 sends a message to head unit 302 informing head unit 302 what operation it should perform. One example of an audio command is: "Tune FM 90.7." Any communication system can be used to facilitate communications between head unit 302 and VCS 330. In some embodiments, a GA-Net bus is used to connect head unit 302 with VCS 330. Use of the GA-Net bus is preferred.

COM1 304 and COM2 306 are capable of communicating with one another. Any suitable form or method of communication can be used. However, a wired link 316 is preferred, and the Controller Area Network (CAN) protocol is preferably used to facilitate communication between COM1 304 and COM2 306. CAN is a well known protocol and employs one or more of the following specifications: ISO 11898, ISO 11898-1 and/or ISO 11898-2.

A user interface is any device that facilitates communication between a user and COM 1 and/or COM2. These devices usually include provisions that assist in collecting information from a user and sending information to the user. Microphones are commonly used to collect information from a user, so user interfaces typically include at least one microphone. In order to provide communication information to a user, a loudspeaker is typically used, so user interfaces include at least one loudspeaker. User interfaces can take on many different forms, shapes, configurations or combinations thereof. In some embodiments, various components are physically separate from one another. For example, microphones and loudspeakers can be placed in different locations from a central unit. Alternatively, the components can be integrated with one another.

In a preferred embodiment, head unit 302 serves as a central portion of the user interface. Head unit 302 can include typical radio and audio playback functions. In addition, head unit 302 is preferably connected to one or more speakers 310 disposed throughout vehicle 100 (see FIG. 1). Speaker(s) 310 are installed in vehicle 100. Head unit 302 can include a display 320 and one or more controls 322. Controls 322 can include a rotary knob, switches and/or buttons.

Both COM1 304 and COM2 306 are connected to head unit 302. The connection between the two communication systems 304 and 306 and head unit 302 permit COM1 304 and COM2 306 to send audio information to head unit 302. Separate audio in and out connectors may be provided in head unit 302 for each communication system. In a preferred embodiment however, a single set of audio connections is provided and that single set of audio connections are split between COM1 304 and COM2 306 so that COM1 304 and COM2 306 share that single set of audio connections on head unit 302.

Figure 4:
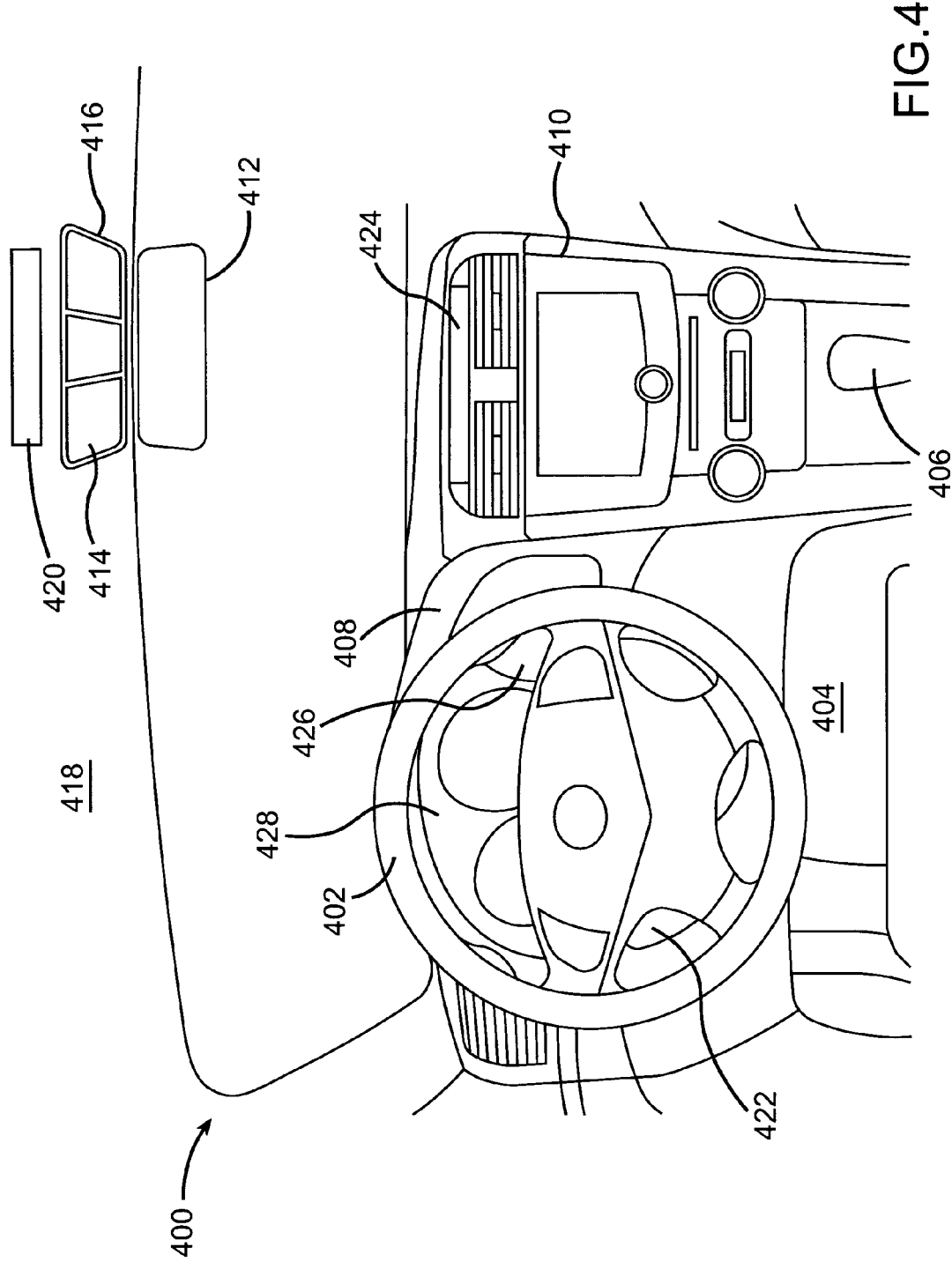
FIG. 4 is a schematic view of the interior of the vehicle shown in FIG. 1.

FIG. 4 shows an exemplary interior 400 of motor vehicle 100 (see FIG. 1). Interior 400 includes steering wheel 402, driver's seat 404, shifter or gear selector 406, dashboard 408, VCS display 410 and rear view mirror 412. Interior 400 includes a Hands Free Telephone (HFT) unit 420 mounted in headliner 418. HFT unit 420 is an embodiment of COM1 304 (see FIG. 3). HFT unit 420 includes microphone 414, which is an embodiment of microphone 308 (see FIG. 3). Microphone 414 may also be used with VCS 330.

HFT unit 420 is mounted above headliner 418 so that it is out of plain sight. HFT controls 422 may also be mounted onto steering wheel 402. An HFT display unit 424 may be disposed in the center console. In addition, some embodiments include a multi-function display 426 disposed on dashboard 408. Multi-function display 426 can also show HFT information and status. In some embodiments, multi-function display 426 is disposed within instrument cluster 428 on dashboard 408. The arrangement of the various components of the HFT system in the embodiment shown in FIG. 4 is intended to be ergonomically correct, and provide the user with an intuitive and easy to use HFT.

While the devices associated with OnStar can be placed in any desired location, the embodiment shown in FIG. 4 shows a particular location of the OnStar devices. OnStar controls and an OnStar microphone 416 are placed in headliner 418 near rear view mirror 412. Other equipment including an OnStar system unit and an OnStar antenna can also be associated with motor vehicle 100 (see FIG. 1). Preferably, the OnStar system unit is placed out of plain view, for example, under the passenger seat or under the rear seats or in the trunk. Preferably, the antenna is disposed on the roof of motor vehicle 100.

Other features of the present invention can be observed by using a specific example of the call managing system. Returning to FIGS. 1 to 4, examples using aspects of the preferred and exemplary embodiments are considered.

In a first example, a call is sent to vehicle 100 by first communication service provider 102 via first communications network 106. Recall that in the exemplary embodiment, first communications network is a cellular telephone network. So, in this example, a typical cellular telephone call has been received by vehicle 100.

Within vehicle 100, cellular telephone 312 receives the call and communicates with COM1 304. COM1 receives the communication from cellular telephone 312 and communicates with head unit 302. Various microphones and loudspeakers are used to assist a user in conducting the call. Loudspeakers help the user to receive information, typically in the form of audible information, and microphones assist the user in sending information, again typically in the form of audible information, to first communications network 106. So, at this time, the call is being conducted, and vehicle 100 is in step 202 (see FIG. 2) because one communication system is active.

While the call is being conducted, a second call from second communications network 108 is sent to vehicle 100. Because COM2 306 is associated with second communications network 108, COM2 306 would receive the second call. Preferably, second communications network 108 is a driver assistance network, and in an exemplary embodiment, COM2 306 is an OnStar device. As the second call is received by vehicle 100, the decision in step 204 would be answered "true" or "yes" and the process would proceed to step 206, where the second call would be received. In some cases, the user can activate second communications network 108 while the user is currently conducting a cellular telephone call. During the call, the user can activate second communications network 108 by pressing the OnStar button. This will cause the OnStar unit to place an OCC call. Also, the user could press the OnStar phone button while conducting a cellular telephone call. Pressing the OnStar phone button activates OnStar SR (speech recognition) and enables the user to place an OPC call. Preferably, both the OnStar button and the OnStar phone button are located near OnStar microphone 416.

At this point, COM2 306 would communicate with COM1 304 via communications link 316 and the two communications systems COM1 304 and COM2 306 would commence a conflict resolution process. As noted above, any process can be used to resolve this conflict between the two communications systems; however, a process using the logic of FIG. 5 is preferred.

Referring to FIG. 5, which is an embodiment of a logic table, possible resolutions to the conflicting calls are provided. Various permutations are possible within the scope of the invention. In some instances, the communications networks provide two or more different types of incoming calls. In some instances, the type of call received is used to determine which communication system is given priority.

In FIG. 5, the upper row represents the current state of the system. The abbreviation, "SR" stands for "speech recognition." The items in the upper row include VCS SR (vehicle control system, speech recognition), HFT SR (hands free telephone, speech recognition), HFT Call (hands free telephone call), On★ SR (OnStar speech recognition), OPC Call (OnStar personal call), OCC Call (OnStar call center call).

The left column represents various events that can occur during the operation of the system. "Activate VCS SR" represents the event when a user uses or interacts with VCS 330 (see FIG. 3) Examples of this event include the use of voice activated climate controls, voice activated radio or audio system controls, and voice activated use of the navigation system. "Activate HFT SR" represents the event where a user uses the speech recognition features of the hands free telephone. This can include situations where a user is speaking the name of a party to be dialed by the hands free telephone. "Incoming HFT Call" represents an incoming telephone call. In the embodiment shown in the Figures, this event relates to a call received by COM1 304. "Activate On★ SR" represents an event where a user uses the speech recognition features of OnStar. Examples of this event include the dialing of a phone number using voice recognition, and the use of virtual advisor, an interactive voice response system associated with OnStar. "Incoming OPC Call" represents an event where the OnStar system receives an incoming personal call. In the embodiment shown in FIG. 3, this event would correspond to COM2 306 receiving an incoming personal call. "Incoming OCC Call" represents an event where the OnStar system receives an incoming call center call. Like the previous event, this event would correspond to COM2 306 receiving an incoming call center call.

The table provides a matrix of outcomes where all of the possible events are correlated with all of the possible initial or current states. One way to use the table is to first determine the current state of the system. Once this has been determined, the current state column is known. After this has been done, an action or event is selected. The actions or events correspond to rows of the table. The contents of the cell that corresponds to both the current state and the action or event provides the result and also provides information regarding the system with priority. Using this table, the relative priorities of the various systems and all of the resolutions to all possible conflicts that can occur can be resolved.

It can be observed in the embodiment shown in FIG. 5, that the OCC call is the most dominant event or state. In other words, the OCC call takes priority over all other states and no event takes priority over an OCC call. The VCS SR in general has the lowest priority and every event or state takes priority over VCS SR. Generally, the current states increase in priority from left to right and the events generally increase in priority from top to bottom, with some exceptions.

As disclosed above, COM1 304 and COM2 306 communicate via wired link 316. VCS 330 communicates with head unit 302 via a wired connection, preferably a wired connection using the GA-Net bus system. To resolve conflicts between the two communications systems, and VCS 330, head unit 302 sends a signal to VCS 330 via the wired connection to stop and terminate the interrupted command. This prevents VCS 330 from executing incomplete commands or message fragments that may have been interrupted by COM1 304 or COM2 306.

In the exemplary embodiment where COM2 is configured to communicate with an OnStar system, there are two types of calls: (1) an advisor call and (2) a personal call. Advisor calls, also known as call center calls, are calls from an OnStar customer service representative and personal calls are calls from third parties. Personal calls are similar to typical wireless telephone calls, but with these calls, third parties, for example, friends and relatives, call and are called using the OnStar system.

Returning to the example, recall that COM1 is currently active. As shown in FIG. 5, this corresponds to the current status of "HFT Call." In other words, the "HFT Call" column would be used in this case. In the example, a call is received by COM2. The system would determine what type of call is being received by COM2.

If an advisor call, also known as a call center call, is being received by COM2, the advisor call would correspond to the "Incoming OCC Call" row as shown in FIG. 5. The cell that corresponds to "HFT Call" column and the "Incoming OCC Call" row includes the term, "OCC Call." So, in this example, the OCC call or advisor call would take priority over the HFT call. This would result in COM2 306 taking control of head unit 302 and interacting with the user.

If a personal call is received by COM2 306, the process can provide a different resolution. Again, because the current condition of the system in the example is that the user is engaged in an HFT telephone call, the current state is defined as "HFT Call" and the "HFT Call" column on FIG. 5 is used to determine priority. In this case, the call received by COM2 306 is a personal call, so the "Incoming OPC Call" row, the second row from the bottom, is used to determine priority. The cell corresponding to the "HFT Call" column and the "Incoming OPC Call" row includes the term, "HFT Call." So in this case, if the user is currently on an HFT call and a personal call is received by COM2 306, COM1 304, which corresponds to the HFT retains priority and is permitted to continue its interaction with the user. In some cases, COM2 306 would indicate a busy condition and the party calling the user using COM2 would receive a busy signal. In this way, the conflict between an active call associated with first communications network 106 and an incoming call associated with second communications network 108 is resolved.

The following is another example where the first call is delivered to vehicle 100 via second communications network 108. In this case, COM2 306 receives the call. In an exemplary embodiment, this first call is a call sent via the OnStar network. Continuing with this example, a second call is sent to vehicle 100 via first communications network 106 while the user is engaged in the first call. The second call is received by either cellular telephone 312 or COM1 304, depending on the particular arrangement of the various components. Recall that COM1 304 can include a cellular telephone or can be a device designed to communicate with a cellular telephone. In a preferred embodiment, COM1 304 is a wireless telephone interface device, so the second call is received by cellular telephone 312. COM1 304 communicates with cellular telephone 312 and receives the call.

At this point, the process is at step 208 where the conflict between the call currently in progress on COM2 306 and the new incoming call on COM1 304 must be resolved. Again, any logic or process can be used to resolve this conflict; however, the preferred process is shown in FIG. 5.

In this example, COM2 306 receives the first call and COM1 304 receives the second call while COM2 306 is active. Recall that, in this example, COM2 306 is an OnStar device. So, the first call is either an OPC call or an OCC call because those are the two types of calls associated with OnStar. Because the first call or event determines the initial state of the system, the first call determines the column that is used on FIG. 5. According to FIG. 5, the last two columns, "OPC Call" and "OCC Call" are the current states of the system. As shown in FIG. 5, COM2 306 retains control of all calls regardless of the type or kind of call received by COM1 304. All calls received by COM1 304 would fall into the "Incoming HFT Call" row, and the cells that correspond to that row and the "OPC Call" column and the "OCC Call" column indicate that the OnStar device retains control. Thus, COM2 306 would retain control of head unit 302 and COM1 304 would terminate, hold or dispose of the incoming call. In some embodiments, COM2 306 would retain control over the user interface, but wireless telephone 312 would still ring and the user can answer wireless telephone 312 independent of COM1 304. In other words, the user can answer wireless telephone 312 while conducting communications with COM2 306 (in this case, OnStar), but the system would not permit the termination of an OnStar communication using the user interface to take a wireless telephone call through the head unit 302. Although this is the preferred arrangement, it is possible for COM1 304 to take priority over COM2 306 in certain situations and circumstances.

In some situations, the user will be on an HFT Call and during the call the user may want to initiate HFT SR (hands free telephone speech recognition). This result is shown as "In HFT Call SR" in FIG. 5. In this situation, the user, while on an HFT Call, uses the speech recognition functionality of the hands free telephone. In some cases, the user may want to transmit one or more DTMF tones. This can be used to transmit passwords, PIN (personal identification numbers) or to respond to an IVR (interactive voice response system). In one embodiment, these DTMF tones are sent by the user speaking: "Send", "1234", "Send". The string, "1234" being the desired DTMF tones transmitted. It is also possible to send DTMF tones by using nametags. In one embodiment, the user can dictate: "Send", "passcode", "Send" and the DTMF tone(s) associated with the nametag, passcode, are transmitted. Another possible function that can be provided for the In HFT Call feature is the ability to transfer the call from hands free mode to the wireless telephone. In one embodiment, this is accomplished by speaking the word "Transfer" while in the In HFT Call mode. Another possible function that can be provided is the mute function. This function allows the user to mute the user's side of the conversation. In other words, speech in the car will not be sent to the other party. In one embodiment, the mute function is activated by speaking the term: "Mute" while in the In HFT Call mode.

The "In HFT Call+Incoming HFT Call" in FIG. 5 refers to a typical call waiting situation. In some cases, the user is on an HFT call and another incoming HFT call will arrive. In some embodiments, these two calls are managed by the associated communications service provider and not by vehicle communications system 300. Typically, the communications service provider manages the two calls by using a call waiting arrangement, as is known in the art.

The remaining results are self evident, and the system, action or event noted on FIG. 5 is the preferred outcome, given the current state and the subsequent action or event. In this way, embodiments of the present invention manage mobile communications from a variety of vehicle systems including two or more communications service providers.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A vehicle communication system comprising:
    a first communication system located in the vehicle, connected to a user interface and capable of sending information to the user interface; the first communication system configured to communicate with a first communications network;
    a second communication system located in the vehicle, connected to the user interface and capable of sending information to the user interface; the second communications system configured to communicate with a second communications network;
    the user interface comprising at least one control and a display;
    the user interface being connected to at least one loudspeaker;
    wherein the first communication system and the second communication system communicate with one another to resolve a conflict and determine which system can communicate with the user interface.

2. The vehicle communication system according to claim 1, wherein the first communication system includes provisions for sending and receiving wireless telephone calls.

3. The vehicle communication system according to claim 1, wherein the first communication system is configured to communicate with a wireless telephone.

4. The vehicle communication system according to claim 1, wherein the first communication system is configured to wirelessly communicate with a wireless telephone.

5. The vehicle communication system according to claim 1, wherein the first communication system is configured to wirelessly communicate with a wireless telephone using Bluetooth.

6. The vehicle communication system according to claim 1, wherein the first communication system is configured to wirelessly communicate with a microphone using Bluetooth.

7. The vehicle communication system according to claim 1, wherein the second communication system is configured to wirelessly communicate with vehicle assistance service provider.

8. The vehicle communication system according to claim 1, wherein the first communication system communicates with the second communication system using CAN.

9. The vehicle communication system according to claim 1, wherein the second communication system is configured to receive different types of calls from a second communication service provider and information related to the different types of calls is used to determine which system can communicate with the user interface.

10. A motor vehicle comprising:
    a chassis and at least one wheel adapted to contact a road surface;
    an interior including a steering wheel, dashboard and driver's seat;
    a first communication system installed in the motor vehicle and in communication with a user interface and configured to communicate with a first communication network;
    a second communication system installed in the motor vehicle and in communication with the user interface and configured to communicate with a second communications network; and
    wherein the first communication system communicates with the second communication system to resolve a conflict and determine which system can communicate with the user interface.

11. The motor vehicle according to claim 10, wherein the first communication system is engaged in an active call and wherein the second system communication receives a second call while the first communication system is engaged in the active call and wherein the active call is interrupted by the second call.

12. The motor vehicle according to claim 10, wherein the first communication system communicates with the second communication system and wherein the two communications systems, by communicating with one another, determine which communication system is given priority.

13. A motor vehicle comprising:
    a chassis, at least one wheel adapted to contact a road surface, and an interior; the interior including a steering wheel, a dashboard and a driver's seat; the motor vehicle further comprising:
    a first communication system in communication with the motor vehicle and configured to communicate with a first communication network;
    a second communication system in communication with the motor vehicle and configured to communicate with a second communications network;
    wherein the first communications network is different than the second communications network; and
    wherein the first communication system communicates with the second communication system to resolve a conflict and determine which system can communicate with a user interface associated with the motor vehicle.

14. The motor vehicle according to claim 13, wherein the first communication system is configured to receive information from a wireless telephone network.

15. The motor vehicle according to claim 13, wherein the second communication system is configured to receive information from a driver assistance network.

16. The motor vehicle according to claim 13, wherein the first communication system and the second communication system communicate with one another and determine which communication system has priority.

17. The motor vehicle according to claim 13, wherein the second communication system interrupts a call in progress on the first communication system.

18. The motor vehicle according to claim 13, wherein the second communication system retains priority over a call received by the first communication system.

19. The motor vehicle according to claim 13, further comprising a vehicle control system wherein the vehicle control system includes speech recognition and wherein the first communication system has priority over the vehicle control system.

20. The motor vehicle according to claim 13, wherein the first communication system retains priority over a call received by the second communication system.

21. A motor vehicle comprising:

a chassis, at least one wheel adapted to contact a road surface, and an interior; the interior including a steering device and a driver's seat; the motor vehicle further comprising:

a first communication system disposed onboard the motor vehicle and configured to communicate with a first communication network;

a second communication system disposed onboard the motor vehicle and configured to communicate with a second communications network;

wherein the first communications network is different than the second communications network; and wherein the first communication system communicates with the second communication system using resources located onboard the motor vehicle to resolve a conflict and determine which system can communicate with the user interface.

22. The motor vehicle according to claim 21, wherein the first communication system is configured to receive information from a wireless telephone network.

23. The motor vehicle according to claim 22, wherein the second communication system is configured to receive an incoming call from a second wireless telephone network.

24. The motor vehicle according to claim 21, wherein the second communication system is configured to receive information from a driver assistance network.

25. The motor vehicle according to claim 21, wherein the first communications system and the second communications system communicate with one another to determine which communication system can communicate with a user interface disposed onboard the motor vehicle.

26. The motor vehicle according to claim 21, wherein the second communication system interrupts a call in progress on the first communication system.

27. The motor vehicle according to claim 21, wherein the second communication system retains priority over an incoming call received by the first communication system and retains access to a user interface disposed onboard the motor vehicle.

28. The motor vehicle according to claim 21, wherein the first communication system retains priority over an incoming call received by the second communication system and retains access to a user interface disposed onboard the motor vehicle.

* * * * *